United States Patent [19]

Amacker

[11] Patent Number: 5,316,104
[45] Date of Patent: May 31, 1994

[54] AUTOMATICALLY ADJUSTABLE TREE CLIMBING STAND HAVING A LOUNGING SEAT

[76] Inventor: Joseph A. Amacker, 1212 Main St., Delhi, La. 71232

[21] Appl. No.: 977,159

[22] Filed: Nov. 16, 1992

Related U.S. Application Data

[63] Continuation-in-part of Ser. No. 818,120, Jan. 8, 1992.

[51] Int. Cl.$^5$ .............................................. A01M 31/02
[52] U.S. Cl. ................................... 182/187; 182/133; 182/188
[58] Field of Search ................. 182/187, 188, 133–136

[56] References Cited

U.S. PATENT DOCUMENTS

| | | |
|---|---|---|
| 932,232 | 8/1909 | Adams ................................. 292/171 |
| 3,485,320 | 12/1969 | Jones . |
| 4,321,983 | 3/1982 | Nelson . |
| 4,331,216 | 5/1982 | Amacker . |
| 4,337,844 | 7/1982 | Hice, Sr. ............................. 182/187 |
| 4,428,459 | 1/1984 | Peck . |
| 4,549,633 | 10/1985 | Merritt . |
| 4,723,630 | 2/1988 | Wolford et al. . |
| 4,834,217 | 5/1989 | Manes . |
| 4,942,942 | 7/1990 | Bradley ................................ 182/187 |
| 4,969,538 | 11/1990 | Amacker ............................. 182/187 |
| 4,995,475 | 2/1991 | Berkbuegler . |
| 4,997,063 | 5/1991 | Bradley . |
| 5,143,176 | 9/1992 | Burdette ............................. 182/187 |

FOREIGN PATENT DOCUMENTS 2657022 7/1991 France ................................ 182/134

OTHER PUBLICATIONS

API Outdoor Inc. "America's Leader in Tree Stand Technology", 1992 pp. 1–3.

Primary Examiner—Alvin C. Chin-Shue
Attorney, Agent, or Firm—Wigman, Cohen, Leitner & Myers

[57] ABSTRACT

The invention relates to an apparatus for climbing an upright columnar member such as a tree, pole, or the like, using two climbing members. The first climbing member has a first upright member gripping structure and an adjustable platform spaced from the upright member to accommodate the body of the user in a sitting position. The adjustable platform is preferably a seat which is adjustable to permit the occupant to recline from an upright sitting position. The second climbing member has a second upright member to accommodate the feet of the user. One or both of the climbing members have a retraction device and locking mechanism for adjustably maintaining the climbing members in substantially horizontal position relative to the ground as the climber ascends or descends the tree.

59 Claims, 3 Drawing Sheets

AUTOMATICALLY ADJUSTABLE TREE CLIMBING STAND HAVING A LOUNGING SEAT

Cross-Reference to Related Application

This application is a continuation-in-part of U.S. Ser. No. 07/818,120 pending, filed Jan. 8, 1992.

BACKGROUND OF THE INVENTION

1. Field of the Invention

The present invention relates to stands which grasp upright columnar members such as trees, poles or the like which permit the user to be securely positioned on the columnar member above the ground. More particularly, the invention relates to climbing stands formed of two climbing members which are alternately raised by the user to attain a desired elevation in a tree, or on a pole or the like. The present invention includes an upper climbing member having a seat which is adjustable to permit an occupant to sit in a reclining or lounging position. Both the upper climbing member and the lower climbing member permit automatic or self-adjustment of the spacing of the grasping members so as to readily effect adjustment of the angle of each climber relative to the upright columnar member.

2. Description of the Prior Art

A tree trunk is tapered and has a reduced diameter as elevation along the trunk is increased. To compensate for this, in conventional two-part climbing stands, it is important to set the initial spacing of the gripping portions of the tree climbing apparatus so as to initially engage both upper and lower frames with the outwardly extending ends oriented at a sufficient upward angle relative to the columnar member such that as the two parts are moved upward in step-wise or tandem alternating fashion, the angle attained at the desired elevation will result in the seat and footrest being substantially level or parallel to the ground. Alternatively, it may be desirable to have either or both frames oriented at a slight angle with the outward end cocked upward relative to the columnar member such that the user will tend to move or fall toward the columnar rather than away from it.

Tree climbing apparatus typically are used by hunters. The hunting environment is frequently characterized by climbing trees in dark, wet and cold conditions, in situations in which minimizing noise is desirable. Initial ascent of a tree is often accompanied by a feeling of excitement and anticipation. Similarly, descent of a tree after a "kill" can be under excited conditions. Alternatively, after a long day of waiting in the cold and wet, a tired, exasperated and hungry hunter must descend the tree. Human nature being what it is, if the initial angle is not chosen properly, and the angle at the desired elevation is thus tilted downward, users frequently tend not to lower the tree stand, reestablish a better starting angle, and start over. Hence, less than optimum angles frequently result with attendant hazards to the users. It is therefore desirable to be able to adjust the angle as the two parts are advanced up the tree. In addition, during periods between ascent and descent, a considerable amount of time may be spent seated while awaiting game to pass by. It is thus desirable for the hunter to be comfortable by having a seat which can recline from an upright position, with the hunter's feet extended outward.

Seating in a comfortable, properly aligned position is an important attribute to be attained by a tree climbing stand. The prior art has addressed this attribute in a somewhat scattered approach with no single tree climbing stand providing features addressed to both adjustable comfort in seating position and adjustable alignment of the tree climbing stand at any vertical position on a tree.

Two part tree stands for use in game hunting which permit upright seating with a separate footrest intended for comfort are known in the art. An example is a treestand sold under the PREDATOR trademark by API-Outdoors, Inc., Tallulah, La. Such seat has the drawback that it does not provide adjustment of the footrest or backrest to permit the user to lounge in the seat. Furthermore, such seat does not provide adjustment of the angle of the seat with respect to the horizontal to compensate for the narrowing of the tree trunk.

A two-part grasping-type tree climbing stand is disclosed in U.S. Pat. No. 4,331,216 to the present inventor, the teachings of which are hereby incorporated by reference. Such patent does not, however, provide for automatic or self-adjustment of the grasping members so that optimum angles of the climbers relative to the upright columnar member can be maintained throughout the ascent and/or descent.

Prior art which discloses attempts to provide adjustable tree climbing members include U.S. Pat. Nos. 4,997,063 and 4,995,475. Tree stands having spring biased locking pins are disclosed in U.S. Pat. Nos. 4,428,459 and 4,834,217. Tethering or connecting upper and lower platforms is shown in U.S. Pat. Nos. 4,549,633, 4,321,983 and 3,485,320.

However, none of these prior art tree climbers permit ready automatic or self-adjustment of the gripping or grasping members such that the optimum desired platform angle can be readily adjusted and maintained, especially taking into account the conditions under which such tree climbers are typically used. Furthermore, none of these prior art tree climbers permits the user to quickly or easily adjust the seat to varying reclining or "lounging" positions while seated in the device.

SUMMARY OF THE INVENTION

In view of the foregoing limitations and shortcomings of the prior art devices, as well as other disadvantages not specifically mentioned above, it should be apparent that there still exists a need in the art for a climbing stand which is comfortable and safe and simple to use, both during and after placement on the tree, pole or the like, and during the removal therefrom. It is, therefore, a primary object of this invention to fulfill this need by providing a simple, reliable climbing stand comprised of two frame members which surround the tree, pole, etc., in which the upper, seating member, is adjustable to permit reclining and on which the spacing of the grasping or gripping members of each of the two frame members is readily and automatically adjustable. These frame members include platforms upon which the user can either sit or stand while facing the tree, pole, etc., and can receive continual support from the rear.

More particularly, it is an object of this invention to provide a climbing stand comprised of an upper frame member and a lower frame member. The upper frame member includes a gripping means to engage the side of the tree or pole facing the user and further includes a platform which is spaced from the tree to accommodate the body and feet of the user in a sitting position which is adjustable from an upright seating position to a position commonly characterized as "reclining" or "lounging". There is also provided a gripping means to engage the side of the tree or pole opposite the user. The lower frame member is similarly formed except that the platform is located adjacent the tree or pole to support the feet of the user during tandem ascent and descent of the tree or pole. The spacing between the gripping means is automatically adjustable for each of the upper and lower frame members.

It is a further object of the invention to provide means to enable the user to safely and securely hold the lower frame member to the upper frame member.

It is a further object of the invention to provide a climbing stand which, when in place, offers the user side support in any direction, thus eliminating the danger of falling when the hunter is shooting from awkward positions.

It is still a further object of the invention to provide a means for adjusting the angle formed by the movable sitting platform with the side support bars on the upper frame member so that the seat of the user may be maintained in a level position or in a position slightly cocked toward the tree to tend to force the user toward the tree rather than away from the tree.

It is still a further object of the invention to provide a means for adjusting the angle formed by the standing platform with the side support bar on the lower frame member so that the feet of the user may be maintained in a level position or in a position slightly cocked toward the tree to tend to force the user toward the tree rather than away from the tree.

A further object of the invention is to provide a more level platform for standing and sitting at lower elevations while achieving the desired angle at the ultimate elevation.

The object of comfort is achieved by a tree climber which permits a user to be seated comfortably in a variety of seating positions ranging from an upright seated position to a reclined seated position. The upper portion of a two-part tandem tree climber is configured to provide a seat in which a footrest portion is pivotable outwardly and upwardly, by means of a pair of extendable diagonal support members. Each extendable diagonal support member has an inner and outer engaging member with the inner engaging member having a plurality of holes to which a spring-loaded locking pin mounted on the outer engaging member is engaged. As a result, the seat reclining angle is incrementally adjustable. A safety button is provided to prevent accidental disassembly of the extendable diagonal support members.

The objects of adjustable inclination are achieved by a two-part climbing stand in which each climbing member has opposing gripping members, at least one of which is attached to extendable arms, which forms a "throat" which encircles and engages the upright columnar member. A spring-biased pin maintains the length of and releases the extendable members. A resilient biasing member, such as an elastic cord or spring, maintains the gripping members attached to the extendable arms in contact with the upright columnar member. Thus, when each climbing member is raised in alternating fashion, by adjusting the length of the extendable arms, the spacing between the gripping member attached to the extendable arms and the other gripping member can be changed automatically, or be rendered self-adjusting, and thereby the angle can be adjusted such that each member is substantially level and parallel to the ground at each elevation or maintained at some other preferred orientation.

With the foregoing and other objects, advantages and features of the invention that will become hereinafter apparent, the nature of the invention may be more clearly understood by reference to the following detailed description of the invention, the appended claims and to the several views illustrated in the attached drawings.

DETAILED DESCRIPTION OF THE INVENTION

Figure 1:
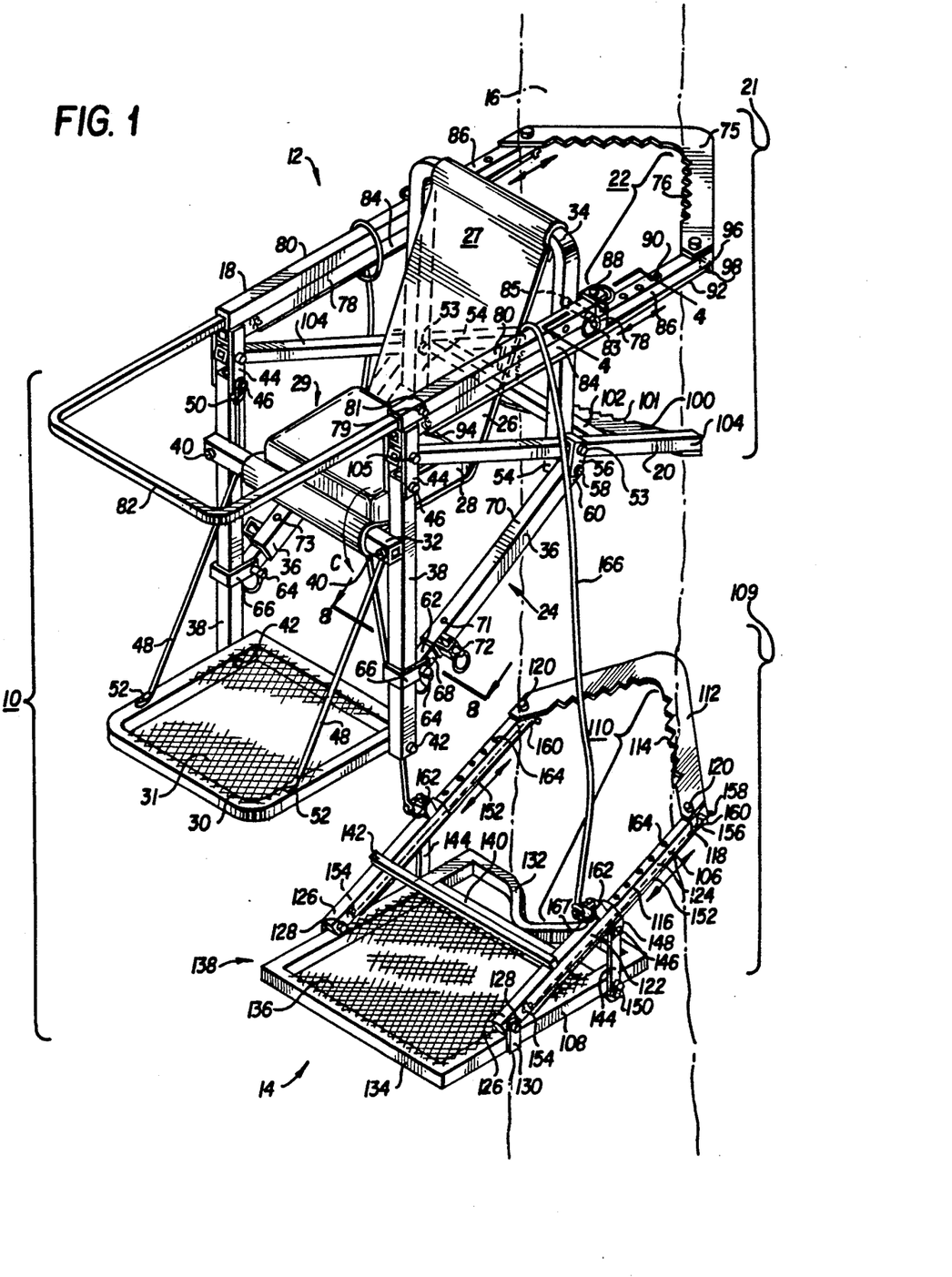
FIG. 1 is a perspective view of an embodiment of the invention mounted on the trunk of a tree.

Referring now in detail to the drawings, wherein like parts are designated by like numerals, there is illustrated in FIG. 1 a first embodiment of the invention. As shown in FIG. 1, an apparatus according to the present invention, designated generally as climbing apparatus 10, includes a first, upper climbing member 12 and a second, lower climbing member 14. As shown in FIG. 1, both the upper climbing member 12 and lower climbing member 14 are disposed around the circumference of an upright columnar member, especially a tapered columnar member 16 such as a tree trunk.

Figure 2:
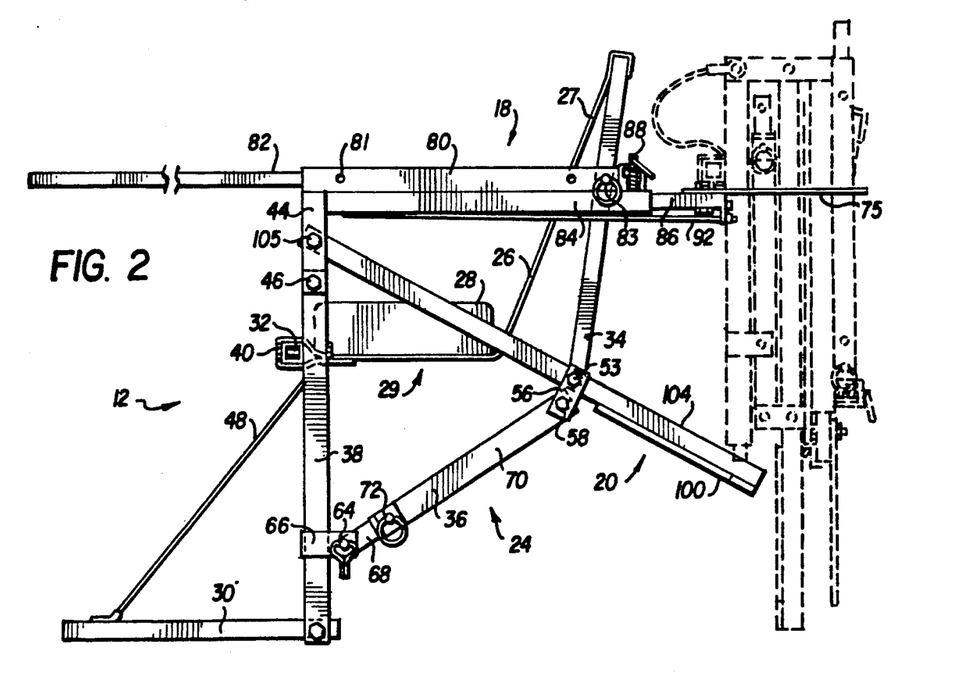
FIG. 2 is a side view of an upper climbing member incorporating the present invention in open or extended position shown in solid lines and in backpack or collapsed position shown in phantom.
Figures 3, 4, 8, 9:
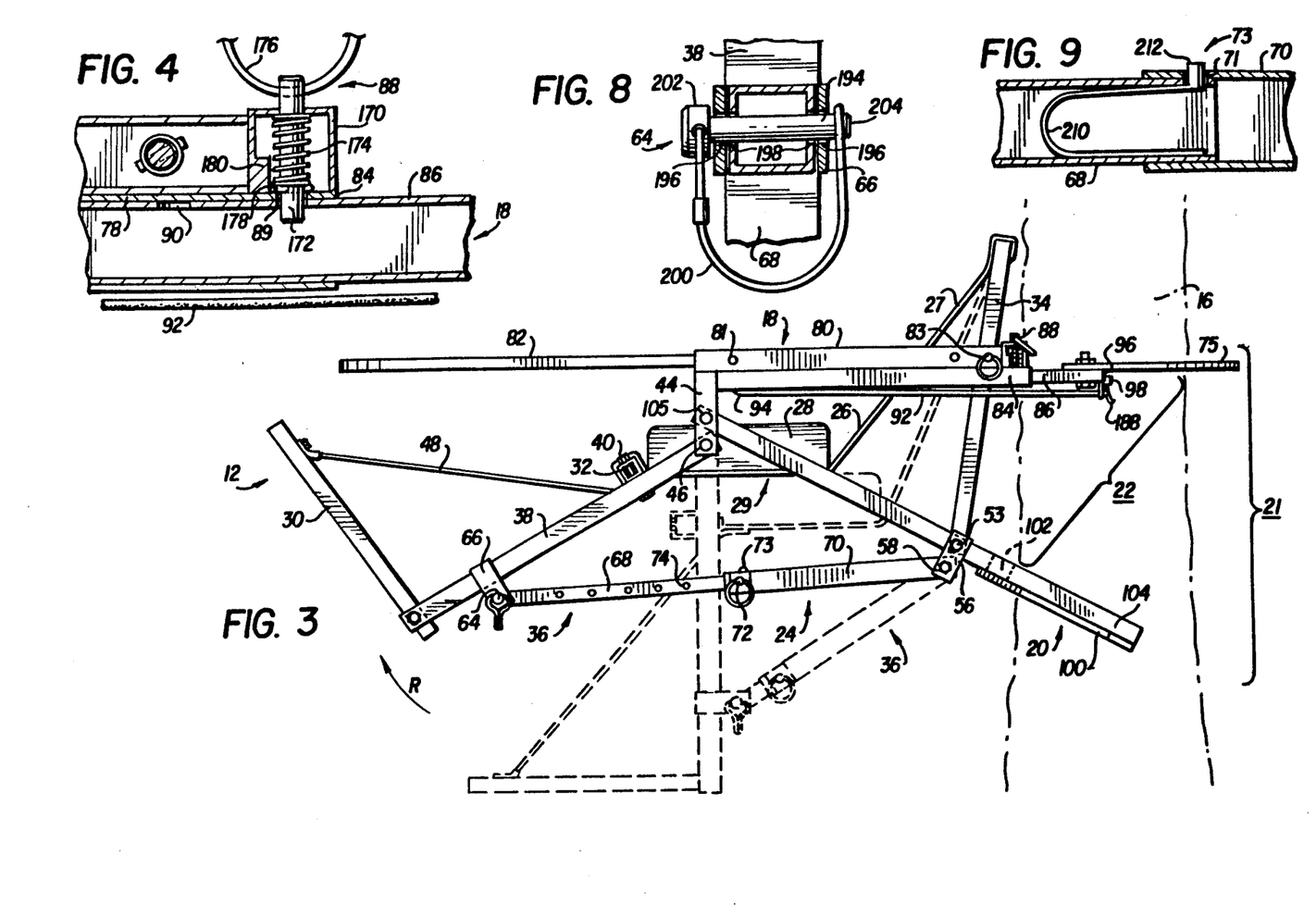
FIG. 3 is a side view of an upper climbing member incorporating the present invention in reclining position shown in solid lines and in upright seating position shown in phantom.
FIG. 4 is a sectional view, taken along line 4—4 of FIG. 1, of a extendable tubular member incorporating a locking pin.
FIG. 8 shows a sectional view, taken along line 8—8 of FIG. 1, of a pin for holding the frame member in open or extended position.
FIG. 9 is a sectional view of a safety button for preventing unintentional disassembly of a seat extendable member.

Upper climbing member 12 is shown in further detail in FIGS. 2 and 3. Upper climbing member 12 is comprised of an outer tubular frame 18 and an inner tubular frame 20, together comprising a gripping frame, generally designated by the numeral 21, which cooperate to provide a space or throat 22 which encompasses the upright columnar member or tree 16, thereby permitting the upper climbing member 12 to be mounted to the tree 16. Tubular seat frame, generally designated by numeral 24, provides the support for seat webbing 26 and cushion 28, which form seat 29. Cushion 28 is pivotally mounted at the front thereof and can be moved forward as shown by arrow C. Footrest 30, having grill 31, is attached to seat frame 24.

Upper climbing member seat frame 24 is comprised of tubular seat front support bar 32, U-shaped seat backrest bar 34, a pair of extendable members 36 (diagonally oriented when seat 29 is in its upright position) and a pair of tubular footrest support members 38. Webbing 26 is preferably made of fabric, cloth or other suitable material and is fastened as by sewing about seat front support bar 32 and seat backrest support bar 34, to form a seating area for cushion 28, thereby forming seat 29. Seat front support bar 32 is substantially horizontal in orientation. Each end of seat front support bar 32 is attached by nut and bolt assemblies 40 to footrest support members 38. Footrest 30 is attached to footrest support members 38 by nut and bolt assemblies 42. Footrest support members 38 are pivotally attached to a pair of brackets 44 by nut and bolt assemblies 46. A pair of footrest support cords 48, preferably made of flexible steel cable, are each attached at upper ends 50 to nut and bolt assemblies 46 and at lower ends 52 to footrest 30 Support cords 48 are trained behind seat front bar 32. Brackets 44 are attached, as by spot welding, adhesive bonding, fastening or other acceptable means to outer tubular frame 18.

Seat backrest bar 34 is pivotally attached to inner tubular frame 20 by nut and bolt assemblies 53 at each open end 54. Nut and bolt assemblies 53 also mount brackets 56 to inner frame 20. Extendable members 36 are pivotally attached to brackets 56 by nut and bolt assemblies 58 at their upper ends 60. Extendable members 36 are pivotally attached at their lower ends 62 by removable pins 64 which engage brackets 66 which are mounted on footrest support members 38 as by spot welding or other appropriate means of attachment. Extendable members 36 are each comprised of an inner bar 68 and an outer sleeve 70. A releasable locking device comprising a locking pin assembly 72, described hereinafter, is mounted on outer sleeve 70 Locking pin assembly 72 engages a plurality of holes 74 in inner bar 68. Inner bar 68 slides within outer sleeve 70, causing footrest 30 support members 38 to pivot outwardly, with footrest 30 pivoting upwardly. Seat webbing 26 is caused to pivot upwardly along with cushion 28, resulting in the back 27 of webbing 26 reclining, as shown in FIG. 3. A safety button 73, described hereinafter, is provided to prevent inner bar 68 from completely disengaging with outer sleeve 70 by engaging hole 71 in outer sleeve 70.

Outer tubular frame 18 includes outer jaw or gripping member 75 having teeth 76 for engaging the backside of tree 16. Outer tubular frame 18 includes a pair of substantially parallel extendable members 78. Attached to the top of each extendable member 78 is a tubular member 80, which receives a U-shaped safety bar 82. Safety bar 82 is slidably received within tubular member 80 and is prevented from disengaging unintentionally by a pair of safety buttons 81 (similar to safety buttons 73) and engaged through a hole 79 in member 80. Spring loaded pins 83 mounted in tubular member 80 engage seat backrest bar 34 in holes 85 to lock the seat backrest bar 34 in place. Each extendable member 78 includes an outer sleeve 84 and an inner bar 86, slidably engaging outer sleeve 84. Locking devices or locking pin assemblies 88, each includes a pin 172 and each of which is of similar construction as locking pin assemblies 72, are mounted on outer sleeve 84 and engage a plurality of holes 90 in inner bar 86 (FIG. 4). A resilient biasing member 92 is attached at end 94 to outer sleeve 84 and engages the end 96 of inner bar 86 by a clip 98, as described hereinafter. Inner tubular frame 20 includes inner jaw or gripping member 100 having teeth 101 with a cross member 102 disposed between and connecting two essentially parallel tubular members 104. Tubular members 104 are pivotally connected to brackets 44 by nut and bolt assemblies 105.

As shown in FIG. 1, lower climbing member 14 is comprised of an outer tubular frame 106 and an inner tubular frame 108, comprising gripping frame 109, which cooperate to provide a space or throat 110 which encompasses the upright columnar member or tree 16, thereby permitting the lower climbing member 14 to be mounted to the tree 16. Lower climbing member 14 is simpler in construction than upper climbing member 12, because, as discussed in detail hereinafter, the primary function of the lower climbing member 14 is to provide a footstand and support the weight of a user during the tandem ascent and descent, when the upper climbing member 12 is being repositioned on the tree 16. Lower climbing member 14 is comprised of outer tubular frame 106 which includes outer jaw or gripping member 112 having teeth 114 for engaging the backside of tree 16. A pair of essentially parallel extendable arms 116 are attached to jaw 112 at their outer ends 118, by nut and bolt assemblies 120. Extendable arms 116 are comprised of an outer female sleeve 122 in which in which an inner male bar 124 is slidably engaged The inner ends 126 of extendable arms 116 are pivotably attached, as by nut and bolt assemblies 128, to brackets 130 which are fastened as by spot welding or other appropriate means to inner frame 108.

Inner frame 108 includes inner jaw or gripping member 132 for engaging the front side of tree 16. Inner jaw 132 is attached to or formed integral with an essentially U-shaped frame member 134, which along with grill 136 forms a footstand 138. A support bar 140 is provided to add rigidity to the inner jaw 132 and frame 108. Connecting members 144 position inner frame 108 and outer frame 106 relative to each other. Connecting members 144 are each attached by a nut and bolt assembly or pin 146 to bracket 148 on extendable arm 116 and attached to inner frame 108 by releasable pin 150. A footbar 142 is attached as by spot welding or other appropriate means to extendable arms 116 to provide a foot operated lifting means for lower climbing member 14. Resilient members 152 are each attached at inner ends 154 to female sleeves 122 of extendable arms 116. The outer ends 156 of resilient members 152 are each attached to the outer ends 158 of male bars 124 by a clip 160. Locking devices or lock pin assemblies 162 engage holes 164 in inner male bars 124, thereby permitting incremental adjustment of the length of extendable arms 116.

Upper climbing member 12 and lower climbing member 14 are tethered by cords 166 trained about frame 18 and attached to rings 167 on locking pin assemblies 162.

FIGS. 4–9 illustrate details of the locking pin assemblies 72, 88 and 162, releasable pins 64 and 150, resilient members 92, 152 and safety buttons 73, 81. Only one numeral designation for each of these components is illustrated and discussed. The operation of similar components having different numeral designations is the same.

FIG. 4 shows locking device 88 as pin 172 engages outer frame 18. The operation of locking devices or pin assemblies 72 and 162 in the upper climbing member extendable diagonal member 36 and in lower climbing member 14, respectively, is the same. Pin housing 170 is mounted on outer sleeve 78. Pin assembly 88 is comprised of pin 172 biased within pin housing 170 by spring 174. Ring 176 is attached to pin 172. Pin 172 extends through hole 89 in outer sleeve 84 into one of a plurality of holes 90 in inner bar 86. Pin keeper 178 extends from a lower portion of pin 172 and is designed to engage housing shoulder or block 180 when pin 172 is lifted and turned approximately 90 so as to hold pin 172 out of holes 89, 90.

Figure 5:
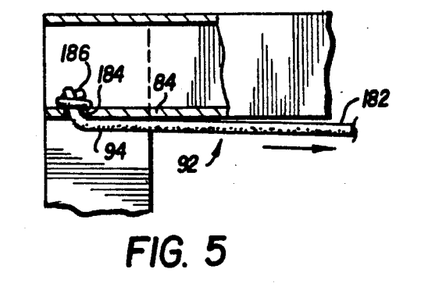
FIGS. 5 and 6 show a sectional view of an inner and of an outer tubular member, respectively, each having a resilient biasing member mounted external to the tubular member.
Figure 6:
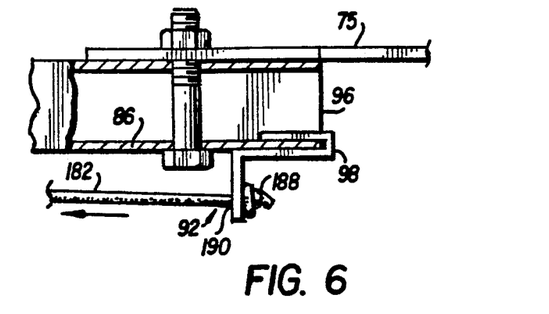
Figure 7:
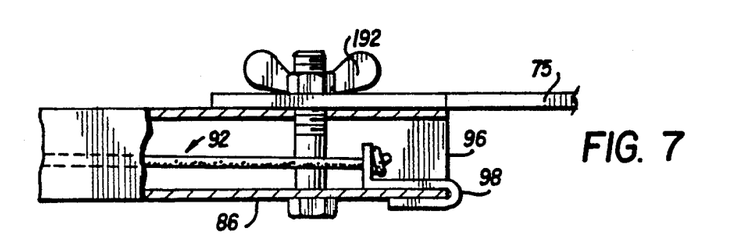
FIG. 7 shows a sectional view of a resilient biasing member mounted interior to the extendable tubular members.

As shown in FIGS. 5 and 6, resilient member 92 is comprised of an elastic cord 182, or other resilient material, which is fitted through a hole 184 in outer sleeve 84 and secured by a knot 186. At the other end of cord 182 another knot 188 through hole 190 in clip 98 attaches the cord 182 to clip 98, which engages the open end 96 of inner bar 86. Other suitable means of attaching cord 182 are contemplated. An alternative arrangement for resilient member 92 is shown in FIG. 7. Therein, resilient member 92 is captured entirely within the inner bar 86 and outer sleeve 84, with clip 98 engaging the open end 96 of inner bar 86. In such a configuration, a wing nut 192 is used to attach outer jaw 75 to inner bar 86. For either arrangement, instead of an elastic cord, other resilient members such as a spring can be substituted.

FIG. 8 illustrates releasable or removable pin assembly 64 in which a pin 194 is fitted through a pair of holes 196 in bracket 66 and through a pair of holes 198 in extendable member 36. A U-shaped loop 200 attached to pin head 202 engages pin end 204 to hold the pin assembly 64 in place when the upper climbing member 12 is extended and to store the pin in bracket 66 when the climbing member 12 is collapsed.

FIG. 9 illustrates safety button 73, which includes a leaf spring 210, with a button 212 attached thereto or formed integral therewith. Leaf spring 210 is biased inside male bar 68 of extendable member 36 for engaging a hole 71 at the end of the female sleeve 70.

The upper climbing member 12 of FIG. 1 can also be used in conjunction with a lower climbing member 14 which is not automatically or self-adjustable. Similarly, the lower climbing member 14 of FIG. can also be used with an upper climbing member 12 which is not automatically or self-adjustable.

The apparatus described herein can be made of any suitable material which is reasonably lightweight and durable and capable of supporting a user of typical physical dimensions. The apparatus is preferably made of lightweight tubular aluminum having a rectangular or square cross section for ease of gripping and offering a flat or level horizontal surface. The resilient members can be of any suitable material such as elastic or rubber or the like, or suitable spring metals, if springs are used. Where nut and bolt assemblies are described, other suitable fasteners such as pins or rivets may be substituted. Where rigid or permanent attachments are required, spot welding, adhesive bonding or other appropriate techniques for attachment may be substituted.

The apparatus of the invention has two operational features, the tandem climbing and automatic level adjustment operation and the upright seating and reclining operation. As ascent of a tree will normally occur first, the operation of the tandem climbing and automatic level adjustment will be discussed first.

The climbing operation of the apparatus of the invention shown in FIG. 1 is substantially the same as discussed in U.S. Pat. No. 4,331,216, but modified to provide automatic or self-adjustment. Lower climbing member 14 is extended by connecting members 144 being engaged between inner frame 108 and outer frame 106 and is mounted on upright columnar member 16. In the embodiment shown, clip 160 is removed from the end 158 of male inner bar 124. Male inner bar 124 is disengaged from female outer sleeve 122 by pulling pin assembly 162 out of holes 164 and turning the pin of pin assembly 162 approximately 90° so that a pin keeper engages a housing shoulder or block as described above, and prevents the pin assembly 162 from reengaging the holes. The spring therein biases the pin against the inside of the housing and against the block as described above. Male inner bar 124 is thus rendered freely slidable relative to female outer sleeve 122. (Such freely slidable motion is also achieved between fixed positions by having the pin of pin assembly 162 pulled out of hole 164 in male inner bar 124 with male inner bar 124 moved sufficiently such that the holes are not aligned. Male inner bar 124 is then removed from female outer sleeve 122. Inner jaw 132 is placed against one surface of upright columnar member 16 flat on the ground or at a desired initial elevation above the ground. Male inner bar 124 is then reinserted into female outer sleeve 122. Clip 160 is then inserted into the open end 158 of male inner bar 124 such that resilient member 152 biases male inner bar 124 into female outer sleeve 122 until outer jaw 112 contacts the opposite side of upright columnar member 16 from that contacted by inner jaw 132, so that upright columnar member 16 is enclosed by throat 110. The pin of pin assembly 162 is then released from the stored position within the housing by turning the pin approximately 90° using ring 167. Appropriate holes in female outer sleeve 122 and male inner bar 124 are aligned by cocking the lower climbing element 14 upward slightly so that the male inner bar 124 slides under biasing force relative to female outer sleeve 122 until the pin of pin assembly 162 drops through aligned the holes. This results in the lower climbing member 14 being placed in an initial position on upright columnar member 16 in either a substantially level orientation relative to the ground or with the outer end of the inner frame 108 cocked slightly upward.

Next, the upper climbing member 12 is extended and is mounted on the upright columnar member 16 above lower climbing member 14 in substantially the same fashion, with the resilient member 92 released by removal of clip 98, the extendable female outer sleeve 84 and male inner bar 86 disassembled and then reassembled encircling the upright columnar member 16, and pin assemblies 88 reengaged. Outer jaw 75 grips the backside of upright columnar member 16 and inner jaw 100 grips the frontside of upright columnar member 16, thus holding upright columnar member 16 in throat 22. The initial elevation of upper climbing member 12 is chosen to correspond to a desired sitting position on the seat 29. In this mounted position, the extendable diagonal members 36 are fully retracted so that the seat 29 is in the upright position. Cushion 28 is folded forward so that room is made to accommodate the legs of a user straddling webbing 26, thus enabling the user to stand on footstand 138 of lower climbing member 14.

If either or both of the upper and lower climbing members have wing nuts 192 (as shown in FIG. 7) for loosening the outer jaw 75 or 112 surrounding or for engaging the upright columnar member 16, then only one wing nut 192 need be removed and the outer jaw 75 or 112 wrapped around the upright columnar member 16 and reattached to the outer frame 18, 106 to engage the upright columnar member 16 and thereby mount the climbing member 12, 14 to the columnar member 16. Such alternative mounting of climbing members is shown in U.S. Pat. No. 4,331,216. If such mounting is employed, then the resilient biasing member 92 or 152 need not be disengaged during the mounting of the climbing member on the columnar member 16. Hence, for such an embodiment, as shown in FIG. 7, the resilient biasing member 92, 152 can be captured entirely within the male inner bar and female outer sleeve.

Regardless of how the climbing members are initially mounted on the upright columnar member 16, and whether the resilient biasing member 92, 152 is captured within the male inner bar 86, 124 and female outer sleeve 84, 122, or is mounted external to the bar 86, 124 and sleeve 84, 122, the operation of the climbing members 12, 14 thereafter is the same in advancing the upper and lower climbing members stepwise in tandem in either the ascending or descending directions.

Once an initial position is established for both climbing members 12, 14 the user can sit on the front support bar 32 of upper climbing member 12, facing the upright columnar member 16 with the user's legs straddling webbing 26. Using his feet, he places his toes and insteps under cross bar 142 of lower climbing member 14, he cocks the lower climbing member 14 upward, increasing the horizontal spacing between inner jaw 132 and outer jaw 112. Lower climbing member 14 is thus free to slide along columnar member 16. By pulling up with his feet, the user can pull lower climbing member 14 up to a position just below upper climbing member 12. By pushing down on grill 136 of footstand 138 and cocking the lower climbing member 14 in the opposite direction the horizontal space between inner jaw 132 and outer jaw 112 is reduced, thus reengaging climbing element 14 with upright columnar member 16. The angle of the platform formed by lower climbing member 14 can then be adjusted by pulling on lines 166 attached to rings 167 of pin assemblies 162. This pulls the pin out of aligned holes, respectively, of male inner bar 124 and female outer sleeve 122. Resilient members 162 keep outer jaw 112 biased against upright columnar member 16. The user, by slightly rocking the lower climbing member 14 with his feet, can cause the holes in male inner bar 124 and female outer sleeve 122 to align and can then release the pin of locking pin assembly 162 to engage the holes and again lock male inner bar 124 and female outer sleeve 122 in place. The horizontal distance between inner jaw 132 and outer jaw 112 will be changed to account for tapering (reduced for ascent, increased for descent) because resilient biasing member 152 reduces the length of the extendable arms 116 and pulls outer jaw 112 toward inner jaw 132, thereby narrowing throat 110.

Once the lower climbing member 14 is raised to the desired position and locked into place with a satisfactory angle automatically adjusted, the user stands on the lower climbing member 14 with his legs straddling webbing 26 of upper climbing member 12 and releases the upper climbing member 12 by cocking the upper climbing member 12 outward and upward. As was the case for the lower climbing member 14, this increases the horizontal distance between the inner jaw 100 and outer jaw 75, hence opening throat 22. The upper climbing member 12, which is gripped by the user's hands can then be slidably moved along the columnar member 16 to a new position corresponding to a desired seating elevation. At such location, the pins 172 of pin assemblies 88 are pulled, removing each pin 172 from aligned holes 90 and 89, respectively, in male inner bar 86 and female outer sleeve 84. As was the case for the lower climbing member 14, the resilient biasing member 92 reduces the length of the extendable arms 78 and pulls outer jaw 75 toward inner jaw 100. By rocking the upper climbing member 12, holes 90 and 89, respectively, in male inner bar 86 and female outer sleeve 84 can be aligned and pin 172 reinserted by spring biasing to lock male inner bar 86 and female outer sleeve 84 into position. The upper climbing member 12 is thus repositioned.

By alternately moving the upper and lower climbing members 12, 14, respectively, in step-wise tandem fashion as described above, and as is known in the art, a user of the climbing apparatus can advance up or down an upright columnar member such as a tree or pole. The angle of each of the upper and lower climbing elements can be adjusted at each new position using the invention, as described above. Thus, a stable, essentially level standing and sitting platform can be established at each new location along the upright columnar member. If desired, the angle can be chosen to tend to move the user toward the tree.

Once a desired vertical location on upright columnar member 16 is reached, each of upper climbing member 12 and lower climbing member 14 is locked in place, with the level adjusted, and otherwise properly secured. The user, holding onto members 18, then steps onto footrest 30 and folds cushion 28 onto webbing 26 to form seat 29. The user then turns, facing away from upright columnar member 16 and sits in seat 29. By pulling pin assemblies 72 to disengage from holes 74 in extendable diagonal members 36, the user permits the extendable diagonal members 36 to extend By pushing on footrest 30 with his feet, footrest 30 is swung outwardly in direction R, as shown in FIG. 3. At the same time the webbing 26 and cushion 28 move forward and upward and the back 27 of seat 29 reclines.

The extendable diagonal members 36 permit incremental adjustment of the amount of reclining of seat 29. A safety button 73, as described above, prevents the male and female parts of extendable diagonal members 36 from totally disengaging unintentionally. When the user desires to descend from the upright columnar member 16 or ascend to a greater height, the seat frame 24 is brought to the upright position by pulling on pin assemblies 72 and pushing footrest 30 downward with the user's feet Extendable diagonal members 36 are then locked in place with locking devices 72.

As used herein, the term "extendable" includes, but is not limited to, members which are extendable and retractable, as well as telescoping.

It will be appreciated that the adjustable lounging stand of the present invention can also be used without a lower climber. In other words, the user can merely attach the upper stand to a tree or the like and enjoy the surroundings.

Although certain presently preferred embodiments of the invention have been described herein, it will be apparent to those skilled in the art to which the invention pertains that variations and modifications of the described embodiments may be made without departing from the spirit and scope of the invention. Accordingly, it is intended that the invention be limited only to the extent required by the appended claims and the applicable rules of law.

What is claimed is:

1. A lounging stand for an upright columnar member, comprising:

a gripping frame for gripping the upright columnar member;

an extendable and retractable seat frame, connected to said gripping frame, for supporting a seat and a footrest, said seat and footrest mounted on said seat frame, said seat and footrest being pivotally movable outwardly from an upright seating position to a reclining seating position, thereby to accommodate a user sitting in an upright position to move to a reclining position.

2. Stand as in claim 1, wherein said extendable and retractable seat frame includes a pair of extendable support members, each support member being attached at its upper end to said gripping frame, said support members adapted to move said footrest, said footrest being pivotable outwardly and upwardly and said seat being movable to a lounging or reclining position.

3. A stand as in claim 2, said gripping frame further comprising:
an inner frame having a first gripping member for gripping said columnar member and a pair of inner arms connected to said first gripping member and adapted to extend outwardly from said columnar member, and an outer frame, connected to said inner frame, having a second gripping member for gripping said columnar member on the side of said columnar member opposite the side gripped by said first gripping member and a pair of outer arms connected to said second gripping member and adapted to extend outwardly from said columnar member.

4. Stand as in claim 2, wherein each of said support members includes two slidably engaging members, for effecting reclining of said seat, and a releasable locking device for positioning said slidably engaging members in a plurality of positions.

5. Stand as in claim 1, further comprising an adjustment member for automatically biasing said gripping frame against said columnar member to maintain said stand in a substantially horizontal position with respect to the ground.

6. Stand as in claim 3, further comprising an adjustment member for automatically biasing said gripping frame against said columnar member to maintain said stand in a substantially horizontal position with respect to the ground.

7. Stand as in claim 4, further comprising an adjustment member for automatically biasing said gripping frame against said columnar member to maintain said stand in a substantially horizontal position with respect to the ground.

8. Stand as in claim 5, wherein said adjustment member comprises an elastic cord releasably attached to said gripping frame.

9. Stand as in claim 6, wherein said adjustment member comprises an elastic cord releasably attached to said gripping frame.

10. Stand as in claim 7, wherein said adjustment member comprises an elastic cord releasably attached to said gripping frame.

11. Stand as in claim 4, wherein said slidably engaging members telescope, one of said slidably engaging members having a first hole for accommodating a spring actuated locking pin, the other of said slidably engaging members having a plurality of holes therein, each alignable with said first hole and said spring actuated locking pin for incrementally adjusting length of each said slidably engaging member.

12. Stand as in claim 6, wherein said pair of outer arms each comprises slidably engaging members.

13. Stand as in claim 12, wherein each said outer arm includes a locking device for positioning said slidably engaging members.

14. Stand as in claim 13, wherein said slidably engaging members telescope, one of said slidably engaging members having a first hole for accommodating a spring actuated locking pin, the other of said slidably engaging members having a plurality of holes therein, each alignable with said first hole and said spring actuated locking pin for incrementally adjusting length of each said slidably engaging member.

15. Stand as in claim 4, wherein said slidably engaging members include an inner slidable member and an outer slidable member and wherein further said locking device for securing said slidably engaging members in a plurality of positions comprises a spring biased pin which unlocks said inner and outer slidable members when pulled outwards and which locks said inner and outer slidable members when released.

16. Stand as in claim 15, further comprising a safety button for preventing complete disengagement of said slidably engaging members.

17. Stand as in claim 12, wherein said slidably engaging members include an inner slidable member and an outer slidable member and wherein further said locking device for securing said slidably engaging members in a plurality of positions comprises a spring biased pin which unlocks said inner and outer slidable members when pulled outwards and which locks said inner and outer slidable members when released.

18. Stand as in claim 17, further comprising a safety button for preventing complete disengagement of said slidably engaging members.

19. Stand as in claim wherein said seat includes a pivotable cushion and a movable back.

20. Stand as in claim 2, wherein said footrest is attached to a pair of support members pivotably mounted on said gripping frame and moved by said extendable support members.

21. Stand as in claim 13, wherein said locking device can be readily operated while the seat user is sitting in the seat.

22. Stand as in claim 15, wherein said locking device can be readily operated while the seat user is sitting in the seat.

23. Stand as in claim 1, wherein said lounging stand is an upper climbing stand and further includes a lower climbing stand.

24. Stand as in claim 13, wherein said lounging stand is an upper climbing stand and further includes a lower climbing stand.

25. Stand as in claim 15, wherein said lounging stand is an upper climbing stand and further includes a lower climbing stand.

26. Stand as in claim 1, further comprising at least one tether for connecting said stand to a lower climbing stand.

27. Stand as in claim 13, further comprising at least one tether for connecting said stand to a lower climbing stand, said lower climbing stand including a locking device.

28. Stand as in claim 15, further comprising at least one tether for connecting said stand to a lower climbing stand, said lower climbing stand including a locking device.

29. Stand as in claim 27, wherein said tether is operatively connected to said locking device.

30. Stand as in claim 28, wherein said tether is operatively connected to said locking device.

31. An apparatus for climbing an upright columnar member, comprising:
an upper climbing member for accommodating the body of a user, including an upper gripping frame for gripping the upright columnar member and an extendable and retractable seat frame, connected to said gripping frame, for supporting a seat and a footrest, each said seat and footrest mounted on said seat frame, said seat and footrest being pivotally movable outwardly from an upright seating position to a reclining seating position, thereby to accommodate the user sitting in an upright position to move to a reclining position; and
a lower climbing member for accommodating the feet of a user, including a lower gripping frame for gripping the upright columnar member and a footstand mounted on said gripping frame;
said upper and lower climbing members adapted to be used stepwise in tandem fashion to ascend or descent the upright columnar member.

32. An apparatus as in claim 31, wherein said extendable and retractable seat frame includes a pair of extendable support members, each support member being attached at its upper end to said gripping frame, said support members adapted to move said footrest.

33. An apparatus as in claim 32, said upper gripping frame comprising,
an inner frame having a first gripping member for gripping said columnar member and a pair of inner arms connected to said first gripping member and adapted to extend outwardly from said columnar member, and an outer frame, connected to said inner frame, having a second gripping member for gripping said columnar member on the side of said columnar member opposite the side gripped by said first gripping member and a pair of outer arms connected to said second gripping member and adapted to extend outwardly from said columnar member.

34. An apparatus as in claim 32, said lower gripping frame comprising:
an inner frame having a first gripping member for gripping said columnar member and a pair of inner arms connected to said first gripping member and adapted to extend outwardly from said columnar member, and an outer frame, connected to said inner frame, having a second gripping member for gripping said columnar member on the side of said columnar member opposite the side gripped by said first gripping member and a pair of outer arms connected to said second gripping member and adapted to extend outwardly from said columnar member.

35. An apparatus as in claim 32, wherein each of said support members includes two slidably engaging members, for effecting reclining of said seat, and a releasable locking device for positioning said slidably engaging members in a plurality of positions.

36. An apparatus as in claim 35, wherein said slidably engaging members telescope, one of said slidably engaging members having a first hole for accommodating a spring actuated locking pin, the other of said slidably engaging members having a plurality of holes therein, each alignable with said first hole and said spring actuated locking pin for incrementally adjusting length of each said slidably engaging member.

37. Apparatus as in claim 33, further comprising an adjustment member for automatically biasing said second gripping member against said columnar member to maintain said upper climbing member in a substantially horizontal position with respect to the ground.

38. Apparatus as in claim 34, further comprising an adjustment member for automatically biasing said second gripping member against said columnar member to maintain said lower climbing member in a substantially horizontal position with respect to the ground.

39. Apparatus as in claim 37, wherein said adjustment member comprises an elastic cord releasably attached to said second gripping member.

40. Apparatus as in claim 38, wherein said adjustment member comprises an elastic cord releasably attached to said fourth gripping member.

41. Apparatus as in claim 33, wherein each of said outer arms telescopes and includes holes for receiving a releasable locking pin.

42. Apparatus as in claim 34, wherein each of said outer arms telescopes and includes holes for receiving a releasable locking pin.

43. Apparatus as in claim 41, further including a locking device for securing said telescoping outer arms in a plurality of positions;
said locking device includes a spring biased pin which unlocks said telescoping outer arms when pulled outward, and which lock said telescoping outer arms when released.

44. Apparatus as in claim 42, further including a locking device for securing said telescoping outer arms in a plurality of positions;
said locking device includes a spring biased pin which unlocks said telescoping outer arms when pulled outward, and which lock said telescoping outer arms when released.

45. Apparatus as in claim 32, further comprising a safety button for preventing complete disengagement of said extendable support members.

46. Apparatus as in claim 36, further comprising a safety button for preventing complete disengagement of said slidably engaging members.

47. Apparatus as in claim 31, wherein said seat includes a pivotable cushion and a movable back.

48. Apparatus as in claim 35, wherein said locking device can be readily operated while a seat user is sitting in the seat.

49. Apparatus as in claim 31, further comprising a safety bar releasably mounted to the front of said gripping frame.

50. Apparatus as in claims 31, wherein said upper and lower climbing members are tethered by a pair of lines releasably connecting the upper climbing member to a locking device on said gripping frame of said lower climbing member.

51. Apparatus as in claim 31, said seat further comprising a webbing adapted to be straddled by the legs of a user when moving said upper climbing member along the upright columnar member.

52. A lounging stand for an upright columnar member, comprising:
a gripping frame for gripping the upright columnar member;
an extendable and retractable seat frame, connected to said gripping frame, for supporting a footrest and a seat, said seat frame having a seat backrest support bar and a seat front support bar, a pair of pivotal support members for supporting said seat front support bar and said footrest mounted thereon, and a pair of extendable and retractable support members extending between said gripping frame and said pivotal support members, said seat mounted on said seat backrest support bar and said seat front support bar, said extendable and retractable support members pivoting said footrest and said seat front support bar outwardly and upwardly when in an extendable position, thereby moving said seat to a reclining position's aid said extendable and retractable support members pivoting said footrest and said seat front support bar inwardly and downwardly when in a retracted position, thereby moving said seat to an upright position.

53. Stand as in claim 52, further comprising an adjustment member releasably mounted external to said gripping frame for automatically biasing said gripping frame against said columnar member to maintain said stand in a substantially horizontal position with respect to the ground.

54. Stand as in claim 53, wherein said adjustment member comprises an elastic cord.

55. Stand as in claim 52, wherein said extendable and retractable support members each include an inner slidable member and an outer slidable member and a locking device for securing said extendable and retractable support members in a plurality of positions comprising a spring biased pin which unlocks said inner and outer slidable members when pulled outwards and which locks said inner and outer slidable members when released.

56. Stand as in claim 52, wherein said seat includes a pivotable cushion and a movable back.

57. A lounging stand for an upright columnar member, comprising:

a gripping frame for gripping the upright columnar member;

an extendable and retractable seat frame, connected to said gripping frame, for supporting a footrest and a seat having a sitting area and a back area, said seat frame including a seat backrest support bar, a seat front support bar, a pair of pivotal support members, and a pair of extendable and retractable support members, said seat mounted on said seat backrest support bar and said seat front support bar, said footrest mounted on said pivotal support members, said extendable and retractable support members pivotally moving said footrest and cooperating with said seat backrest support bar and said seat front support bar so as to move said seat to a reclining position when said footrest is pivoted outwardly and to move said seat to an upright position when said footrest is pivoted inwardly.

58. Stand as in claim 1, wherein said seat and footrest move upwardly and outwardly.

59. Stand as in claim 31, wherein said seat and footrest move upwardly and outwardly.

* * * * *

UNITED STATES PATENT AND TRADEMARK OFFICE
CERTIFICATE OF CORRECTION

PATENT NO. : 5,316,104
DATED : May 31, 1994
INVENTOR(S) : Joseph A. Amacker

It is certified that error appears in the above-indentified patent and that said Letters Patent is hereby corrected as shown below:

Claim 19, column 12, line 35, "claim wherein" should be --claim 1, wherein--.

Claim 52, column 15, line 10, "position's aid" should be --position, and--.

Signed and Sealed this

Third Day of January, 1995

BRUCE LEHMAN

*Attest:*

*Attesting Officer*       *Commissioner of Patents and Trademarks*